(12) United States Patent
Flory et al.

(10) Patent No.: US 6,367,859 B1
(45) Date of Patent: Apr. 9, 2002

(54) VEHICLE SEAT WITH LOAD CARRYING BACKREST

(75) Inventors: Gerhard Flory, Böblingen; Thomas Geisel; Ralf-Henning Schrom, both of Rottenburg; Michael Böhmer, Rockenhausen; Hans Edrich, Heltersberg; Andreas Kinzer, Hamburg; Thomas Weber, Kaiserslautern, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/688,211

(22) Filed: Oct. 16, 2000

(30) Foreign Application Priority Data

Oct. 15, 1999 (DE) .......................... 199 49 728

(51) Int. Cl.[7] .............................. B60N 2/02
(52) U.S. Cl. ................ 296/68.1; 296/65.16; 296/65.13; 297/216.1; 297/216.13; 188/373
(58) Field of Search ............................ 296/68.1, 65.01, 296/63, 65.13, 65.16; 188/373; 297/216.1, 216.13, 216.15, 216.16, 216.18, 216.19

(56) References Cited

U.S. PATENT DOCUMENTS

| 2,379,385 | A | * | 6/1945 | Styers |
| 3,531,153 | A | * | 9/1970 | Mohs |
| 3,885,810 | A | * | 5/1975 | Chika |
| 3,944,276 | A | * | 3/1976 | De Rosa et al. |
| 4,251,100 | A | * | 2/1981 | Rolandelli |
| 5,538,117 | A | * | 7/1996 | Bouchez |
| 5,588,703 | A | * | 12/1996 | Itou |

FOREIGN PATENT DOCUMENTS

| DE | 0211248 | * | 2/1987 |
| DE | 197 11 944 | | 9/1998 |

* cited by examiner

Primary Examiner—Joseph D. Pape
(74) Attorney, Agent, or Firm—Crowell & Moring LLP

(57) ABSTRACT

A motor vehicle's rear bench seat has a back seat structure acting as a reclining back and at least one cam plate for guiding the seat back structure relative to a part affixed to the car structure. An element is provided for the absorption of energy, acting in case of a collision, between the cam plate and the part affixed to the car structure.

27 Claims, 3 Drawing Sheets

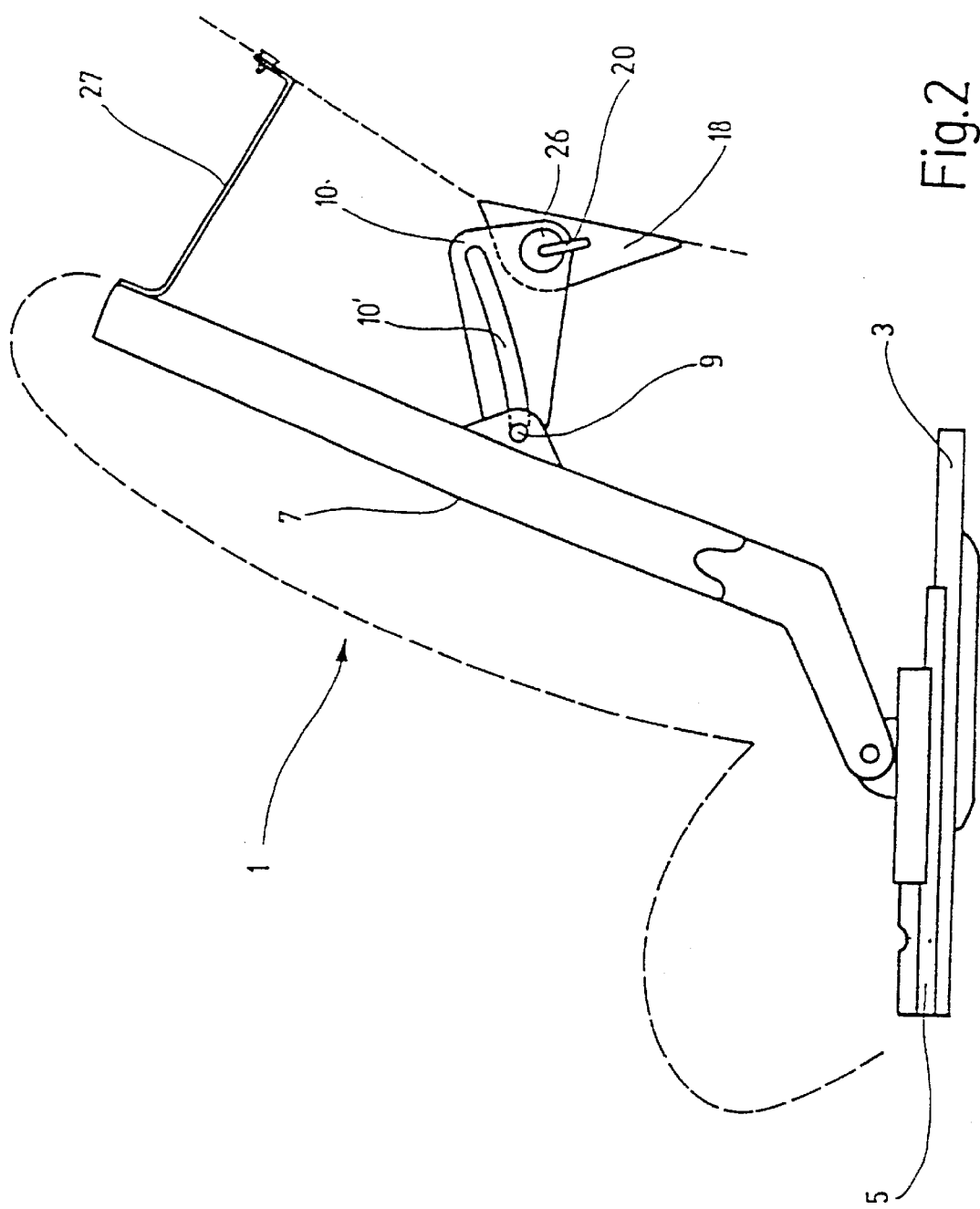

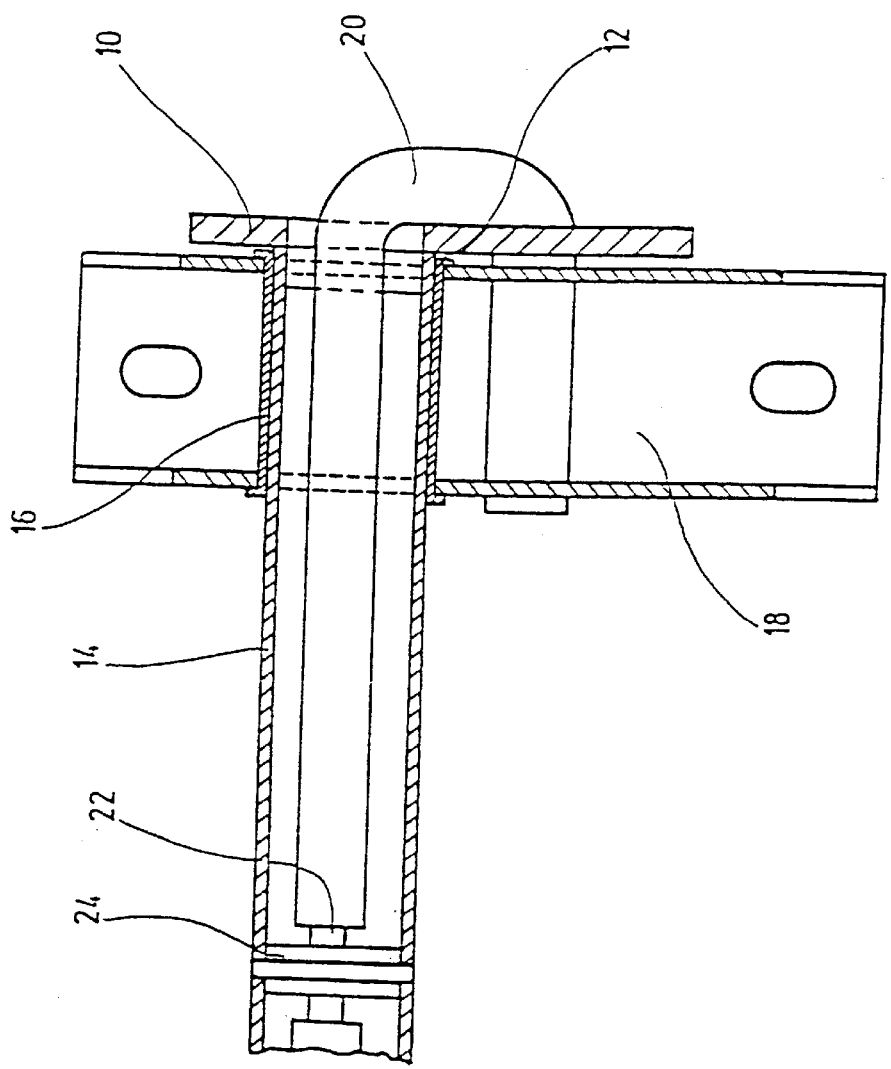
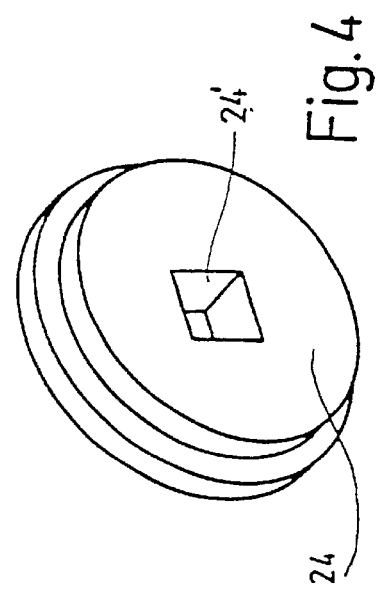

VEHICLE SEAT WITH LOAD CARRYING BACKREST

BACKGROUND AND SUMMARY OF THE DISCLOSURE

This application claims the priority of 199 49 728.1, filed in Germany, Oct. 15, 1999, the disclosure of which is expressly incorporated by reference herein.

The invention relates to a car seat, especially a motor vehicle rear bench seat with a seat back structure acting as a reclining back, and at least one cam plate to guide the back structure relative to a part affixed to the vehicle structure.

In known car seats of this kind, the seat-back structure is linked to top runners which are guided in rails affixed to the car's structure. The user can adjust the inclination of the seat back by shifting the top runner so as to obtain different seat positions and seat back positions. The seat back structure is guided, for example, by cross bolts or cross rods in cam plates affixed to the car's structure. In case of a frontal collision the danger exists that the seat back structure may be accelerated against the user, causing injury. Also there is the danger of "submarining," i.e., the user can slip under the lap belt.

The invention is addressed to the problem of improving a car seat of the kind described above. This problem is solved according to the invention by a car seat of the above noted type wherein between the cam plate and the part affixed to the vehicle structure, an element acting in case of a collision, is provided for the absorption of energy.

Inasmuch as an element is provided for energy absorption which acts between the slide and the part affixed to the vehicle, it is precisely at this point that a definite absorption and dissipation of the kinetic energy of the seat back structure is possible, which will protect the user against injury from the seat back structure and avoid the danger of submarining. Preferably, the element acting in a collision will be subject to a torsion. Thus the element will be able to absorb great forces without the need to be of especially stable construction.

In a preferred embodiment the cam plate runs forward, for example around a transverse tube. It then frees a path for a movement of the seat back structure, so that only the element acting in a collision will absorb the stresses. If the transverse tube is journaled in a bearing bracket affixed to the car's structure and is permanently affixed to the slide, a unit is available which turns as a whole. The element acting in a collision is preferably disposed non-rotatably inside of the transverse tube so as to absorb the torque at one end. If the element is brought out of the transverse tube and inserted into the bearing bracket, the element is non-rotatably affixed at the other end to the car's structure. The absorbed torque can then produce the torsion. To keep the element better in the bearing bracket when the stress is acting on it, so is will not be forced out of it, the element can be inserted through two lateral flanges of the bearing bracket. If the element is bent around the cam plate between the transverse tube and the bearing bracket, on the one hand the cam plate can turn freely, and on the other hand the element occupies little space. It is advantageous if the element is inserted into a disk which is fixedly mounted in the center of the transverse tube. Then the element can well absorb the torque, and on the other hand can be easily installed or replaced.

It is advantageous if in addition a catching belt acting in a collision is provided between the seat back structure, preferably its upper margin, and the car's structure. The leverage of the forward driven seat back structure is then not so great.

other objects, advantages and novel features of the present invention will become apparent from the following detailed description of the invention when considered in conjunction with the accompanying drawings.

BRIEF DESCRIPTION OF THE DRAWINGS

FIG. 2 is a side view of the seat back structure of the embodiment of FIG. 1 in a collision situation, with the upholstery indicated;

FIG. 3 is a section taken along the line III—III in FIG. 1, through a portion of the seat back structure; and FIG. 4 is a perspective view of a disk in the seat back structure.

DETAILED DESCRIPTION OF THE INVENTION

Figure 1:
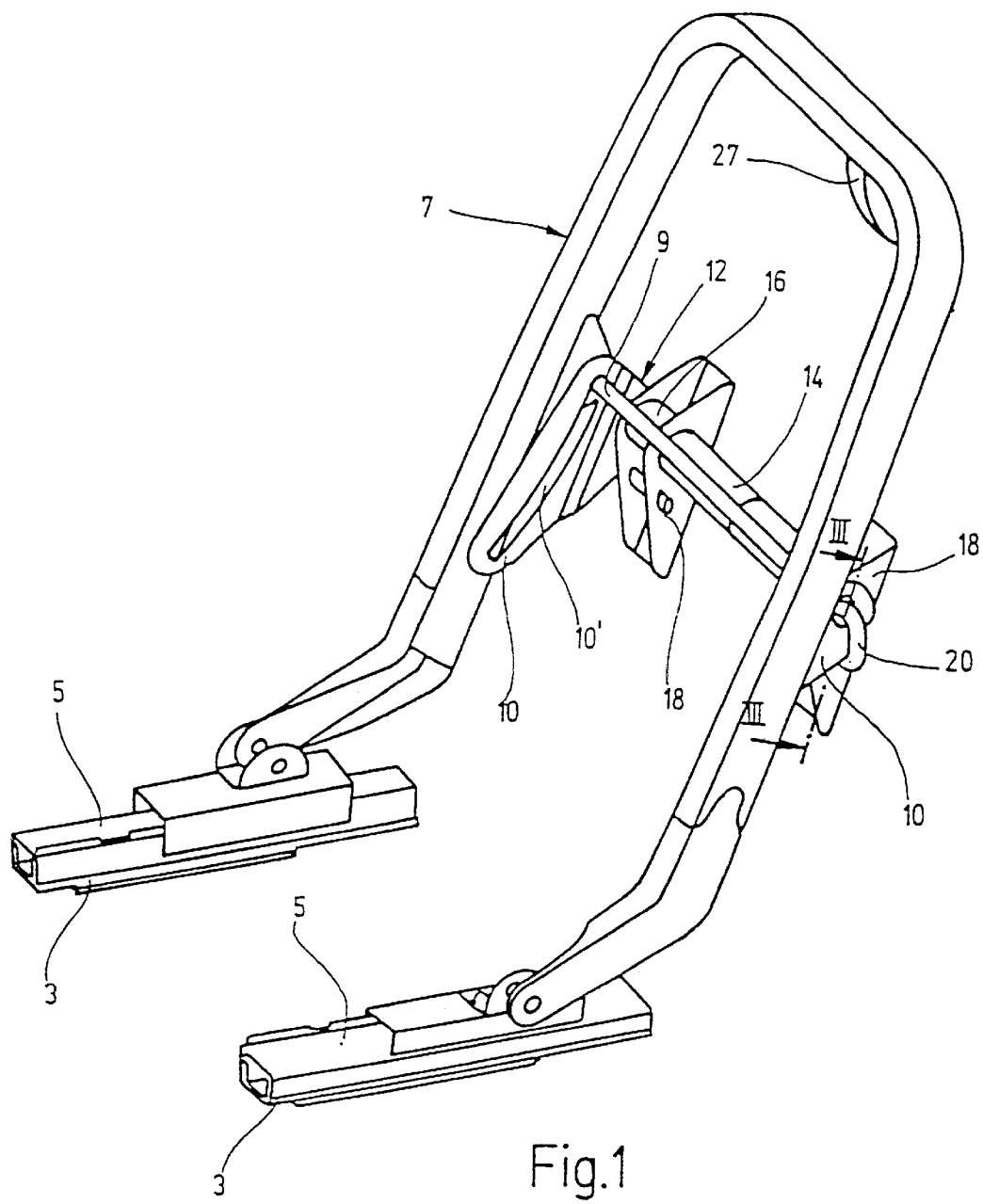
FIG. 1 is a perspective view of a seat back structure constructed according to a preferred embodiment of the invention, shown in a sitting position.

A car seat 1 configured as the rear seat of a motor vehicle, the orientation of which is defined by the following directional information, has for each passenger side a bottom rail 3 fastened to the car's structure, and a top rail 5 carried on the bottom rail 3. A seat back structure 7 is journaled on the two top rails 5. The seat back upholstery to be applied to the back structure 7 and the seat cushion to be attached to the upper rails 5 are indicated in outline in FIG. 2.

The seat back structure 7 has a square section open at the bottom and bent to an approximate U-shape, in which the ends of its arms are provided with adapters to form joints with the upper rails 5. Approximately at midpoint, the seat back structure 7 has a horizontal transverse rod 9 disposed transverse to the direction of travel of the car and attached to the arms of the seat back structure 7. The transverse rod 9 is carried at each end in slots 10' in a cam plate 10 belonging to a cam unit 12 to be described in greater detail below. The cam slots 10' extend at a slight angle to the vertical.

This arrangement offers the user of the car seat 1 a so-called recliner. By shifting the top rails 5 relative to the bottom rails 3 the seat back structure 7 linked to the top rails 5 is shifted at its lower end lengthwise of the motor vehicle. Since the transverse rod 9 is guided in the cam slots 10' the upper part of the seat back is raised or lowered so that, overall, a change in the inclination of the seat back structure 7 results. Thus the user can continuously adjust the back rest of the car seat 1 between a sitting position represented in FIG. 1 and a reclining position, not shown, in which the transverse rod 9 is situated almost at the bottom ends of the cam slots 10'.

The cam unit 12 has a transverse tube 14 divided into two sections at the center of its length, which is mounted at its extremities in bearing bush 16 in two bearing brackets 18. The transverse tube 14 is welded at its extremities to the cam plates 10. The transverse tube 14 is parallel to the transverse rod 9. The bearing brackets 18 fastened to the vehicle structure, for example with bolts, and made in a mirror-image configuration, have each a rectangular, flat center portion and two triangular lateral portions bent forward vertically from their longer sides, through which a bearing bush 16 is inserted. The bearing bush 16 accommodating the transverse tube 14 is perpendicular to the side parts of the bracket 18.

In the case of a bipartite torsion bar 20, each half consists of a solid steel bar of circular cross section which is bent to a J-shape with two limbs of different length. The longer limb is provided at its end with a square 22 which is preferably in one piece with the torsion bar 20. The torsion bar 22 is fitted into a corresponding central opening 24' in a disk 24. The other half of the torsion bar 20 is inserted, with a corresponding square 22 in a mirror-image relationship with the first half, into the opening 24' in the disk 24. The long legs of the torsion bar 20 are arranged inside of the transverse tube 14 which has a larger diameter, and the disk 24 is welded equally at its outer circumference to both halves of the transverse tube 14. Disk 24 has preferably a bevel on one or on both faces so that the two halves of transverse tube 14 can be welded, one after the other, to the disk 24.

The torsion bar 20 is arranged within the cam unit 12 so that its bent portion extends at both ends out of the transverse tube 14, being centered by a centering sleeve 26 provided in the end section of the transverse tube 14 between transverse tube 14 and torsion bar 20. With this bent portion the torsion bar 20 reaches behind the cam plate 10 on the side facing rearward of the direction of travel. The further, short leg of the torsion bar 20 running parallel to the long leg, is passed through an opening in the side portion of the bearing bracket 18, preferably also through a second opening in line therewith in the other side portion of the bearing bracket 18.

In case of a frontal collision of the motor vehicle, the seat back structure 7 is accelerated forward relative to the vehicle's structure. The seat back 7 then starts to turn about the upper joint on the rail 5. A catching belt 27 fastened at one end to the top of the seat back structure 7 and at the other end to the car body is thereby drawn taut and then delivers to the car's structure a small portion of the kinetic energy caused by the collision. The movement of the seat back structure 7 causes the transverse rod 9 to move forward, i.e., to the bottom end of the two cam slots 10'. There it carries the cam plate 10 further forward, resulting in a swinging movement (clockwise in FIG. 2) of the cam unit 12 with the transverse tube 14, joined for rotation together with the cam plates 10, as the axis of rotation. The transverse tube 14 therefore turns on the bearing bushes 16 in the bearing bracket 18 and carries with it the disk 24 which is affixed to it. The disk 24 then begins to twist the torsion bar 20 by its square ends 22. Since the torsion bar 20 has its short arms inserted into the bearing bracket 18, it is unable to follow the torque of the cam unit 12, so that the torsion bar 20 twists to dissipate the kinetic energy of the collision.

In the event of a collision, the accelerated seat back structure 7 is therefore retarded mostly by the twisting of the torsion bar 20 and slightly also by the capture belt 27, so that the user of the car seat 1 is protected against injury by the seat back structure. After the collision the torsion bar 20 can easily be replaced due to its plug-in nature.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed:

1. A motor vehicle rear bench seat, with a seat back structure acting as a reclining back, and at least one cam plate which can be used to guide the back structure relative to a part which can be affixed to a vehicle structure, wherein, between the cam plate and the part which can be affixed to the vehicle structure, an element acting in case of a collision is provided for absorption of energy;

wherein the element acting in case of a collision is contained non-rotatably within a transverse tube.

2. Car seat according to claim 1, wherein the element acting in case of a collision is subjected to torsion.

3. Car seat according to claim 1, wherein, in case of a collision, the cam plate turns on a transverse tube.

4. Car seat according to claim 2, wherein, in case of a collision, the cam plate turns on a transverse tube.

5. Car seat according to claim 3, wherein the transverse tube is journaled in a bearing bracket affixed to the vehicle structure and is fixedly joined to the cam plate.

6. Car seat according to claim 5, wherein the element acting in case of a collision is contained non-rotatably within the transverse tube.

7. Car seat according to claim 5, wherein the element acting in case of a collision is brought out of the transverse tube and inserted into the bearing bracket.

8. Car seat according to claim 7, wherein the element acting in case of a collision is passed through two side parts of the bearing bracket.

9. Car seat according to claim 7, wherein the element acting in case of a collision is bent around the cam plate between the transverse tube and the bearing bracket.

10. Car seat according to claim 8, wherein the element acting in case of a collision is bent around the cam plate between the transverse tube and the bearing bracket.

11. Car seat according to claim 1, wherein the element acting in case of a collision is inserted into a disk which is fixedly mounted in the middle of the transverse tube.

12. Car seat according to claim 7, wherein the element acting in case of a collision is inserted into a disk which is fixedly mounted in a middle area of the transverse tube.

13. Car seat according to claim 8, wherein the element acting in case of a collision is inserted into a disk which is fixedly mounted in a middle area of the transverse tube.

14. Car seat according to claim 8, wherein the element acting in case of a collision is inserted into a disk which is fixedly mounted in a middle area of the transverse tube.

15. Car seat according to claim 1, wherein a capture belt acting in case of a collision is provided between the seat back structure and the vehicle structure.

16. Car seat according to claim 2, wherein a capture belt acting in case of a collision is provided between the seat back structure and the vehicle structure.

17. Car seat according to claim 3, wherein a capture belt acting in case of a collision is provided between the seat back structure and the vehicle structure.

18. Car seat according to claim 5, wherein a capture belt acting in case of a collision is provided between the seat back structure and the vehicle structure.

19. Car seat according to claim 7, wherein a capture belt acting in case of a collision is provided between the seat back structure and the vehicle structure.

20. Car seat according to claim 8, wherein a capture belt acting in case of a collision is provided between the seat back structure and the vehicle structure.

21. Car seat according to claim 9, wherein a capture belt acting in case of a collision is provided between the seat back structure and the vehicle structure.

22. Car seat according to claim 11, wherein a capture belt acting in case of a collision is provided between the seat back structure and the vehicle structure.

23. A motor vehicle rear bench seat, with a seat back structure acting as a reclining back, and at least one cam plate which can be used to guide the back structure relative to a vehicle structure, wherein, between the cam plate and a part which can be affixed to the vehicle structure, an energy absorbing element is provided for absorbing energy during a collision.

24. Car seat according to claim 23, wherein the element acting in case of a collision is subjected to torsion.

25. Car seat according to claim 23, wherein, in case of a collision, the cam plate turns on a transverse tube.

26. Car seat according to claim 24, wherein, in case of a collision, the cam plate turns on a transverse tube.

27. Car seat according to claim 25, wherein the transverse tube is journaled in a bearing bracket affixed to the car structure and is fixedly joined to the cam plate.

* * * * *